(12) United States Patent
Ulrich et al.

(10) Patent No.: US 9,212,434 B2
(45) Date of Patent: Dec. 15, 2015

(54) BLEND OF LYOCELL AND FLAME RESISTANT FIBERS FOR PROTECTIVE GARMENTS

(75) Inventors: Amy McSwain Ulrich, Lake Wylie, SC (US); Brian Patrick Shiels, Charlotte, NC (US)

(73) Assignee: PBI Performance Products, Inc., Charlotte, NC (US)

( * ) Notice: Subject to any disclaimer, the term of this patent is extended or adjusted under 35 U.S.C. 154(b) by 837 days.

(21) Appl. No.: 12/778,633

(22) Filed: May 12, 2010

(65) Prior Publication Data

US 2010/0297905 A1    Nov. 25, 2010

Related U.S. Application Data

(60) Provisional application No. 61/180,451, filed on May 22, 2009.

(51) Int. Cl.
| | | |
|---|---|---|
| *D02G 3/02* | (2006.01) | |
| *A41D 31/00* | (2006.01) | |
| *D04B 1/16* | (2006.01) | |
| *C08L 1/02* | (2006.01) | |
| *D02G 3/04* | (2006.01) | |
| *D02G 3/44* | (2006.01) | |
| *D03D 1/00* | (2006.01) | |
| *D03D 15/00* | (2006.01) | |
| *D03D 15/12* | (2006.01) | |

(52) U.S. Cl.
CPC *D04B 1/16* (2013.01); *A41D 31/00* (2013.01); *C08L 1/02* (2013.01); *D02G 3/045* (2013.01); *D02G 3/443* (2013.01); *D03D 1/0041* (2013.01); *D03D 15/0011* (2013.01); *D03D 15/12* (2013.01); *D10B 2201/20* (2013.01); *D10B 2331/021* (2013.01); *Y10T 442/3976* (2015.04); *Y10T 442/3984* (2015.04); *Y10T 442/40* (2015.04); *Y10T 442/696* (2015.04)

(58) Field of Classification Search
CPC ......... D02G 3/02; D02G 3/04; D02G 3/045; D02G 3/047; D02G 3/44; D02G 3/443; D02G 3/442; A41D 31/022; A41D 31/0033; A41D 31/0011
USPC .......... 442/189, 197, 301, 414, 416; 428/920, 428/921
See application file for complete search history.

(56) References Cited

U.S. PATENT DOCUMENTS

| | | | | |
|---|---|---|---|---|
| 4,014,829 | A * | 3/1977 | Baird et al. | 524/34 |
| 5,208,105 | A * | 5/1993 | Ichibori et al. | 428/373 |
| 5,870,807 | A * | 2/1999 | Beaty et al. | 28/167 |
| 2003/0148689 | A1 | 8/2003 | Lapierre | |
| 2004/0029473 | A1* | 2/2004 | McKee et al. | 442/181 |
| 2004/0192134 | A1 | 9/2004 | Gibson et al. | |
| 2004/0235383 | A1* | 11/2004 | Perry et al. | 442/344 |
| 2005/0032449 | A1* | 2/2005 | Lovasic et al. | 442/209 |
| 2006/0116043 | A1 | 6/2006 | Hope et al. | |
| 2006/0264136 | A1* | 11/2006 | Chiantese | 442/304 |
| 2008/0057807 | A1 | 3/2008 | Tutterow et al. | |
| 2008/0085651 | A1 | 4/2008 | Handermann et al. | |
| 2008/0124993 | A1 | 5/2008 | Brady | |
| 2009/0075047 | A1* | 3/2009 | Masuda et al. | 428/219 |

FOREIGN PATENT DOCUMENTS

WO    WO 2006/043958 A1    4/2006

OTHER PUBLICATIONS

Humphries, Mary. Fabric Reference. Prentice-Hall, Upper Saddle River, NJ. 1996. pp. 75-77.*

* cited by examiner

*Primary Examiner* — Jenna Johnson
(74) *Attorney, Agent, or Firm* — Hammer & Associates, P.C.

(57) ABSTRACT

A unique blend of fibers used to create a yarn or fabric useful in protective garments including a lyocell fiber, and a flame resistant fiber that is not a modacrylic and/or does not require the emission of gases and/or acids for flame resistance. The lyocell fiber is approximately 5% to 55% of the blend, and the flame resistant fiber is approximately 45% to 95% of the blend. The resulting fabric requires no post treatment for flame resistance.

14 Claims, No Drawings

BLEND OF LYOCELL AND FLAME RESISTANT FIBERS FOR PROTECTIVE GARMENTS

RELATED APPLICATION

This application claims the benefit of provisional application Ser. No. 61/180,451 filed May 22, 2009.

FIELD OF THE INVENTION

The invention is directed to a blend of lyocell fibers and flame resistant fibers to make flame resistant fabrics from which protective garments can be made.

BACKGROUND OF THE INVENTION

Protective clothing refers to primary and secondary protective clothing (per ASTM Standard F1494-03). Primary protective clothing is designed to be worn for work activities during which significant exposure to molten substance splash, radiant heat, arc flash, and/or flame is likely to occur. Secondary protective clothing, on the other hand, is protective clothing designed for continuous wear for work activities in designated locations in which intermittent exposure to molten substance splash, radiant heat, arc flash, and/or flame source is possible.

Protective clothing in the work place is important because it is the employer's responsibility to identify risks and hazards in the workplace and seek out appropriate protective garments and equipment for the protection of workers. Common workplace hazards include, for example: open flames, high heat, flash fire, flammable liquids, flammable soils, molten metals, sparks, slag from flame cutting, welding, high voltage electrical discharges, electric arc events, vapors from volatile liquids, and combustible dusts. These hazards may be encountered at structural fires, active military fields, Wildland fires, urban search and rescue incidents, in foundries, at electrical utilities, in the chemical, oil, gas and petrochemical industries, in auto racing, areas of rioting, and illicit drug manufacturing labs, just to mention a few.

Fabrics have been developed for use in protective clothing. Popular fabrics include: PBI GOLD® (PBI Performance Products, Inc of Charlotte, N.C.), COMFORT BLEND® (Tencate of Union City, Ga.), FREESTYLE™ (Tencate of Union City, Ga.), and INDURA® ULTRASOFT® (Westex, Inc. of Chicago, Ill.). PBI GOLD® is a 40% PBI/60% para-aramid blend. COMFORT BLEND® is 65% meta-aramid/35% FR rayon blend. FREESTYLE™ is 93% meta-aramid/5% para-aramid (KEVLAR®) fiber/2% antistatic fiber. INDURA® ULTRASOFT® is 88% FR cotton/12% nylon blend (all % are by weight of the fabric). Each of these fabrics has its own unique blend of properties.

The present invention provides a fiber blend, or yarn from said fiber blend, from which a fabric for a protective garment may be constructed. The blend includes a lyocell fiber and a flame resistant fiber, also known as an "FR" fiber. None of the flame resistant fabrics described above include lyocell fibers.

Lyocell is a flammable fiber made from wood pulp cellulose. The Federal Trade Commission defines lyocell as "a cellulose fabric that is obtained by an organic solvent spinning process." The FTC classifies the fiber as a sub-category of rayon. Lyocell shares many properties with other cellulosic fibers such as cotton, linen, ramie and rayon. Some main characteristics of a lyocell fiber is that it is soft, absorbent, very strong when wet or dry, moisture wicking, anti-bacterial, and resistant to wrinkles. Lyocell can also be machine-washed, hand-washed, or dry-cleaned, it drapes well, and it can be dyed many colors, as well as simulating a variety of textures like suede, leather, or silk. See FiberSource (www-.fibersource.com/f-tutor/lyocell.htm and www.tencel.at).

One known manufacture of lyocell fibers is the Lenzing Group of Austria. Lenzing markets their Lyocell fiber under the trademark Tencel®. However, Lyocell is not available from Lenzing Fibers in an FR fiber format. Because lyocell fibers are not inherently flame resistant, this means that non-FR Lyocell fibers are lyocell fibers that have not been treated with a flame retardant.

Flame resistant fibers, aka FR fibers, are those fibers that have flame resistance as an essential characteristic of the fiber. Flame resistant fibers could be inherently flame resistant fibers or fibers treated to become flame resistant. Typically, a treated fiber is a conventional textile fiber that has been treated with a flame retardant, a chemical substance used to impart flame resistance. Not only can the fiber be treated with a flame retardant, but the resulting fabric can also be treated with a flame retardant to make the fabric flame resistant. For example, treated fibers or fabrics include: FR cotton, FR treated Rayon (both FR cellulosics), and the like. Inherently flame resistant fibers may include, but are not limited to: aramids, polyamide imides, melamines, polybenzimidazole (PBI), polyimides, polyphenylene benzodisoxazole (PBO), polyphenylene sulfide (PPS), Polytetrafluoroethylene (PTFE), polyetherether ketone (PEEK), modacrylic, FR Rayon, glass, carbon, and the like. Most often, these flame resistant fibers (treated and/or inherent) are blended together to obtain a yarn for a fabric with a particular blend of properties. Those properties include thermal protection, break-open protection, static resistance, comfort, durability, stability, appearance, moisture management, abrasion resistance, anti-bacterial, ease of laundry maintenance, color, and relative cost.

One known flame resistant fabric that utilize the cost, comfort, absorbency, and durability of lyocell fibers, especially non-FR Lyocell Fibers, with the flame resistant properties of a flame resistant fiber, is disclosed in US Patent Publication No. 2008/0057807. This fabric requires an FR modacrylic (modacrylic is inherently flame resistant, i.e., the terms 'FR modacrylic' and merely 'modacrylic' can be used interchangeably) to be blended with the non-FR lyocell. Another known flame resistant fabric that utilizes lyocell fibers with the flame resistant properties of a flame resistant fiber is disclosed in US Patent Publication No. 2008/0124993. The fabric disclosed is 15-25% FR modacrylic fibers blended with 75-85% FR treated cellulose, like rayon or lyocell. Thus, the fabric disclosed in this publication, not only requires an FR modacrylic to be blended with the lyocell fiber to extinguish the flame, but it also requires the lyocell fiber to be treated with a flame retardant. These two patent publications show that, prior to the instant invention, it was believed that a lyocell fiber could not be blended with flame resistant fibers to create a protective garment, especially with lyocell fibers present at a significant portion of the fabric (i.e., greater than 5%, unless the flame resistant fiber included modacrylic or the resultant fabric was finished with an FR treatment.

The instant invention is designed to address this problem and provide for new fabrics that will meet new and emerging needs of the industry by providing a flame resistant fabric/yarn made from lyocell fibers that does not require the use of modacrylic or the need to finish the fabric with an FR treatment.

SUMMARY OF THE INVENTION

The present invention is a unique fiber blend from which yarns and/or fabrics are made. The yarn or fabric is made of a blend of fibers including a lyocell fiber, and a flame resistant fiber that is not a modacrylic and/or does not require the emission of gases and/or acids for flame resistance. The lyocell fiber is approximately 5% to 55% of the blend, and the flame resistant fiber that does not require the emission of gases and/or acids for flame resistance is approximately 45% to 95% of the blend. The resulting fabric requires no post treatment for flame resistance.

DETAILED DESCRIPTION OF THE INVENTION

Fabrics are planar structures made of fibers and/or yarns assembled by various means such as weaving, knitting, tufting, felting, braiding, or bonding of webs to give the structure sufficient strength and other properties required for its intended use. A yarn is a generic term for a continuous strand of textile fibers, filaments, or materials in a form suitable for knitting, weaving, or otherwise intertwining to form a fabric. Yarn occurs, for example, in the following forms: (1) a number of fibers (e.g., staple) twisted together (spun yarn); (2) a number of filaments laid together without twist (a zero-twist yarn); (3) a number of filaments laid together with a degree of twist; (4) a single filament with or without twist (a monofilament); or (5) a narrow strip of materials, such as paper, plastic film, or metal foil, with or without twist, intended for use in a textile construction.

The yarns and fabrics discussed hereinafter are used as primary or secondary protective clothing. The garments formed from these yarns and fabrics may include, but are not limited to, shirts, pants, coveralls, overalls, jackets, liners, coats, parkas, headwear, footwear, t-shirts, underwear, gloves, and any other protective clothing (primary or secondary protective clothing). For example, the garments formed from these yarns and fabrics may be next-to-skin garment or fabrics, and non-next-to-skin garments or fabrics. The fabrics may be laminated or combined with other fabrics or materials to enhance functionality.

The textile fabric may be made by any manner, including, but not limited to, being woven, non-woven, or knitted. The woven fabric may include, but is not limited to: plain weave, twill weave, satin weave, the like, and any combination thereof. Knitted fabrics may include, but are not limited to: warp and weft (circular) knitted fabrics, including, but not limited to jersey, rib, fleece, and interlock constructions. Non-woven fabrics may include, but are not limited to: needlepunched, and hydro-entangled constructions. In one embodiment, the fabrics may be woven or knitted. The resulting fabric shall require no post treatment for flame resistance.

The fabrics are preferably made of the yarn hereinafter described, but are not so limited. Fabrics within the scope of the present invention have a weight ratio of lyocell fibers of 50-55% of the blend, and the flame resistant fiber that does not require the emission of gases and/or acids for flame resistance is the remaining 45%-95% of the blend. The fabric may have spun yarns including: a first staple fiber being the lyocell fiber; and a second staple fiber being the flame resistant fiber that is not a modacrylic and/or does not require the emission of gases and/or acids for flame resistance. In one embodiment, the lyocell fibers are approximately 10% of the blend and the flame resistant fiber is the remaining approximately 90% of the blend. Other fibers may be added so long as the foregoing ratios are maintained. For example, a conventional textile fiber could be added to a blend having the foregoing ratio.

The Lyocell fiber may be any lyocell fiber, including, but not limited to a non-FR treated Lyocell fiber. For example, the non-FR treated Lyocell fiber may be, but is not limited to, a Tencel® G100® fiber, provided by Lenzing Group.

The flame resistant fiber of the instant invention may be any flame resistant fiber that is not modacrylic and/or does not require the emission of gases and/or acids for the extinguishing of a flame. These types of flame resistant fibers include, but are not limited to, an inherently flame resistant fiber (but not modacrylic), a treated fiber, and any combinations thereof. As examples, the flame resistant fibers that are not modacrylic and/or do not require the emission of gases and/or acids to extinguish a flame may be, may be, but are not limited to: an inherently flame resistant rayon, a flame resistant cellulosic, an aramid, a polyamide-imide, a melamine, a polybenzimidazole (PBI), a polyimide, a polyphenylene benzodisoxazole (PBO), a polyphenylene sulfide (PPS), a polyetherether ketone (PEEK), the like, and any combinations thereof. For example, aramids (meta-aramids and para-aramids) are available as TWARON®, CONEX®, and TECHNORA® from Teijin Co. of Osaka, Japan; NOMEX® and KEVLAR® from DuPont of Wilmington, Del.; P84 from Imitech of Austria; and KERNEL® from Kermel Company of Colmar, France. Flame resistant Rayons are available as Lenzing FR from the Lenzing Group. Melamines (melamine formaldehydes) are available as BASOFIL® from Basofil Fibers LLC of Charlotte, N.C. PBI is available from PBI Performance Products, Inc., of Charlotte, N.C. PBO is available as ZYLON® from Toyobo Co. Ltd. of Osaka, Japan.

However, one inherently flame resistant fiber that does require the emission of gases and/or acids for flame resistance is modacrylic or FR modacrylic (modacrylics are inherently flame resistant, thus, the terms 'FR modacrylic' and merely 'modacrylic' may be used interchangeably). As such, modacrylics and FR modacrylics are flame resistant fibers that do require the emission of gases and/or acids for flame resistance and are, therefore, not included as part of the instant invention.

The resulting fabric shall require no post treatment for flame resistance. This means that the resulting fabric is inherently flame resistant and requires no topical treatment, like any chemicals commonly known as FR treatments for fabrics and garments.

In one embodiment, the flame resistant fiber that is not a modacrylic and/or does not require the emission of gases and/or acids for flame resistance may include a Polybenzimidazole ("PBI") fiber. The blend may include any amount of PBI fiber between 0-50% of the blend, including, but not limited to, approximately 20%. The PBI fiber may be provided by PBI Performance Products, Inc. of Charlotte, N.C.

In one embodiment, the flame resistant fiber that is not a modacrylic and/or does not require the emission of gases and/or acids for flame resistance may include a flame resistant rayon, or FR-Rayon. The flame resistant rayon may be any flame resistant rayon. The blend may include any amount of FR rayon between 45-95% of the blend, including, but not limited to, approximately 70% of the blend. The flame resistant rayon may be a FR viscose provided by Lenzing Group of Austria under the trademark Lenzing FR®.

In one embodiment of the instant invention, the blend of fibers, including a non-FR Lyocell fiber and a flame resistant fiber that is not a modacrylic and/or does not require the emission of gases and/or acids for flame resistance, may be spun into a yarn. This yarn may be used for anything, including, but not limited to, being used in a textile fabric. The textile fabric may be any textile fabric and may be made by any manner, including, but not limited to, being woven, non-woven, or knitted, as discussed above. The resulting textile fabric may be used in protective garments, including, but not limited to, protective garments for military, fire service, first responder, and industrial applications.

The benefits of the instant blend of non-FR Lyocell fibers and flame resistant fibers that are not a modacrylic and/or do not require the emission of gases and/or acids for flame resistance, is that the blend utilizes the cost, comfort, moisture management, and durability of non-FR Lyocell fibers, while not decreasing the efficacy of the flame resistant fibers, without the need to emit any gases and/or acids. The resulting fabric also does not require post treatment for flame resistance. This may be particularly advantageous for protective garments that require flame resistance, but still desire to function as a garment. The resultant fiber blend may include benefits compared to other protective garments, such as, but not limited to: cost, dyeability, comfort, moisture management, anti-bacterial properties, durability after exposure, anti-odor, strength, abrasion resistance, flame resistance, and any combinations thereof.

The instant invention of a yarn or fabric may be provided in an innovative next-to-skin fabric technology. This technology may combine break open protection from heat and flash fire with comfort and moisture management. The instant fabrics may be inherently flame resistant (no FR post treatment required), light-weight, soft and flexible, and at the same time durable. In addition, the instant fabric or yarn may provide significantly more moisture movement than other commercial flame retardant fabrics. With approximately 200 lower weight than that of knit fabrics containing Nomex, Modacrylic, Carbon-X, and FR Cotton, the instant invention may minimize the risk of heat stress related injuries, allowing for greater ease in movement, with greater FR protection.

The instant invention may provide fabrics that are available in a variety of colors, constructions, and nominal commercial weights, including, but not limited to: 4.3 osy Jersey, 4.5 osy Rib, 6.0 osy Stretch Rib, 6.1 osy Interlock and 8.0 osy Fleece. These different colors, constructions, and weights may be determined by the needs of value and protection for the desired markets. These desired markets may include, but are not limited to: Military, Fire Service, Wildland, Tactical, Motorsports, EMS and Industrial. Based on desired market, fabric could be available in colors including, but not limited to: black, navy blue, foliage green, coyote brown, tan and heather grey. Various embodiments of the instant invention may meet the demands of most any environment.

In one embodiment of the instant invention, the fabric may include a Lyocell fiber, a PBI fiber and a flame resistant rayon. The fabric may include between 10% to 30% by weight of the yarn of the PBI fiber (filament or staple); between 5% to 20% by weight of the non-FR lyocell fiber (filament or staple); and between 50% to 85% by weight of the FR Rayon fiber (filament or staple). In one embodiment, the Lyocell fiber may be approximately 10% by weight of the fabric, the PBI fiber may be approximately 20% by weight of the fabric, and the flame resistant rayon may be approximately 70% by weight of the fabric.

One particular benefit of this fabric made from a blend of non-FR Lyocell fibers, PBI fibers and FR-rayon fibers, is that it may provide a fabric for a protective garment that does not require the material to emit gases or acids to extinguish a flame. The resulting fabric also does not require any post treatment for flame resistance. One known fire resistant fabric that includes lyocell fibers is a lyocell and modacrylic material, commercially known as DRIFIRE®. Prior to the instant invention, it was commonly known that when materials were blended with lyocell, they had to be blended with modacrylic in order to extinguish a flame or be post treated with an FR chemical. The reason being that modacrylic emits gasses/acids (may include hydrogen cyanide and hydrochloric acid) in order to replace available oxygen in order to self extinguish the flame. It has been suggested that these gases/acids that are emitted may cause a type of dermal health hazard. On the other hand, when blended with PBI, lyocell does not need the help of the gases/acids emitted by the modacrylic. As a result, this blend of fabric including Lyocell and PBI fibers does not need to emit gases/acids to self extinguish and, thus, does not contribute to the additional dermal health hazard. Additionally, the PBI fiber makes the fabric inherently flame resistant, meaning no FR post treatment is required.

Another particular advantage of the instant fabric made from a blend of non-FR Lyocell fibers, PBI fibers and FR-rayon fibers may be to provide a fabric for a protective garment having an improved vertical flammability property. The vertical flammability property may be determined under ASTM D6413 and may include measurements for char length, after flame, and after glow. In one embodiment, the vertical flammability property of the instant invention may include an after flame of 4 seconds, a char length of less than 4 inches and an after glow of less than 5 seconds. In another embodiment, the vertical flammability property of the instant invention may include an after flame of less than 2 seconds, a char length of less than 2 inches and an after glow of less than 2 seconds.

Yet another particular advantage of the instant fabric made from a blend of non-FR Lyocell fibers, PBI fibers and FR-rayon fibers may be to provide a fabric for a protective garment having an improved burst strength. Burst strength may be measured under ASTM D3787 and may include measurements for the burst strength of the material initially and after a 4 second exposure to a heat source of 2 cal/cm2/sec. In one embodiment, the burst strength after a 4 second exposure to a heat source of 2 cal/cm2/sec of the instant invention may be greater than 0.5 pounds. In another embodiment, the burst strength after a 4 second exposure to a heat source of 2 cal/cm2/sec of the instant invention may be greater than 5 pounds.

Yet another particular advantage of the instant fabric made from a blend of non-FR Lyocell fibers, PBI fibers and FR-rayon fibers may be to provide a fabric for a protective garment having an improved break-open time. Break-open time may be measured under MIL-C-83429B3.7 and may include measurements for the burst time it takes the material to break-open when exposed to direct flame. Due to limiting factors of the test equipment, the tests under MIL-C-83429B3.7 are only conducted for a max of 60 seconds. Any material with a break-open time of greater than 60 seconds is listed as such. In one embodiment, the break-open time under MIL-C-83429B3.7 of the instant invention may be greater than 10 seconds. In another embodiment, the break-open time under MIL-C-83429B3.7 of the instant invention may be greater than 30 seconds.

Additional features or advantages of the instant embodiment of Lyocell fibers, PBI fibers and FR rayon fibers, include, but are not limited to the fabric having the following properties: inherently flame and heat resistant; will not burn, melt, drip or break-open; lightweight and soft; minimizes heat stress; wicks sweat from body at more than 8 times the rate of 100% cotton, and 1.5 times that of Nomex; durable, long lasting performance; easy to care and maintain; may utilize a supplemental anti-microbial technology to fight odor causing bacteria; and no off-gassing required to extinguish flame.

The invention will be further described with reference to a yarn, it being understood that the foregoing fabric discussion is applicable to the following yarn as well as the foregoing fabric discussion. The yarn may be adapted for use in a protective garment and may be made in any conventional fashion. Moreover, the yarns may include other conventional textile fibers (natural or man-made) provided that the addition of such fibers does not have a detrimental impact on the overall performance of the yarns, fabric, or garment.

The yarn of the instant invention may include: a first staple fiber being a lyocell fiber, and a second staple fiber being a flame resistant fiber that is not a modacrylic and/or does not require the emission of gases and/or acids for flame resistance. The lyocell fiber may be approximately 5% to 55% by weight of the yarn. The flame resistant fiber that is not a modacrylic and/or does not require the emission of gases and/or acids for flame resistance may be approximately 45% to 95% by weight of the yarn. In one embodiment, the lyocell fiber may be approximately 5% to 30% by weight of the yarn, and the flame resistant fiber may be approximately 70% to 95% by weight of the yarn. In another embodiment, the lyocell fiber may be approximately 10% by weight of the yarn, and the flame resistant fiber may be approximately 90% by weight of the yarn. The resulting yarn may be inherently flame resistant, meaning it needs no post FR treatment for flame resistance.

In one embodiment of the yarn, the yarn may include a non-FR Lyocell fiber, a PBI fiber, and a FR-Rayon fiber. The yarn may include between 10% to 30% by weight of the yarn of a PBI fiber (filament or staple); between 5% to 20% by weight of a non-FR lyocell fiber (filament or staple); and between 50% to 85% by weight of a FR Rayon fiber (filament or staple). In one embodiment, the yarn may comprise 20% of a PBI fiber; 10% of a non-FR lyocell fiber; and 70% of a FR Rayon fiber.

The foregoing invention may be better understood with reference to the following non-limiting examples.

In the Table, the invention is compared to other fabrics used in protective garments. The test methods and criteria are set forth in the Table. INV refers to different embodiments of the inventive fabric in different constructions and different weights which were all made from yarns made from: 10% non-FR Lyocell fibers, 20% PBI fibers, and 70% FR rayon fibers. The first comparative material ("1$^{st}$ COMP MATERIAL") refers to a 6.4 osy rib knit material made from 20% PBI staple fibers and 80% FR Rayon fibers. The second comparative material ("2$^{nd}$ COMP MAT") is a 6.1 osy jersey knit fabric consisting of 85% Modacrylic fibers and 15% Rayon (commercially known as DRIFIRE®). The third comparative material ("3$^{rd}$ COMP MATERIAL") is a lighter weight, 5.1 osy, jersey knit fabric consisting of 85% Modacrylic fibers and 15% Rayon (also commercially known as DRIFIRE®).

TABLE

| Criteria (units) | Test Source | INV Jersey | INV RIB | INV Stretch Rib | INV Interlock | INV Fleece | 1$^{st}$ COMP MATERIAL Rib Knit | 2$^{nd}$ COMP MATERIAL Modacrylic jersey | 3$^{rd}$ COMP MATERIAL Light Weight Modacrylic jersey |
|---|---|---|---|---|---|---|---|---|---|
| Blend | | 10% non-FR Lyocell | 10% non-FR Lyocell | 10% non-FR Lyocell | 10% non-FR Lyocell | 10% non-FR Lyocell | 20% PBI | 85% Modacrylic | 85% Modacrylic |
| | | 20% PBI fiber | 20% PBI fiber | 20% PBI fiber | 20% PBI fiber | 20% PBI fiber | 80% FR Rayon | 15% Viscose Rayon | 15% Viscose Rayon |
| | | 70% FR Rayon | 70% FR Rayon | 70% FR Rayon | 70% FR Rayon | 70% FR Rayon | | | |
| Nominal Commercial Weight/Mass | | | | | | | | | |
| osy | | 4.5 | 4.5 | 5.5 | 6.0 | 7.0 | 6.0 | | |
| Actual Weight/Mass | | | | | | | | | |
| oz/yd2 (osy) | ASTM D3776 | 4.0 | 4.8 | 6.5 | 6.8 | 7.2 | 6.4 | 6.1 | 5.1 |
| Thickness | | | | | | | | | |
| (inches) | ASTM D1777 | 0.019 | 0.032 | 0.035 | 0.045 | 0.080 | 0.036 | 0.022 | 0.025 |
| Vertical Flammability Original | | | | | | | | | |
| After Flame (sec) | ASTM D 6413 | 0.0 × 0.0 | 0.0 × 0.0 | 0.0 × 0.0 | 0.0 × 0.0 | 0.0 × 0.0 | 0.3 × 0.6 | 0.0 × 0.0 | 0.0 × 0.0 |
| After Glow (sec) | | 1.7 × 1.2 | 1.7 × 1.9 | 1.3 × 1.3 | 1.8 × 2.1 | 1.3 × 2.8 | 1.5 × 2.5 | 12.4 × 11.1 | 13.5 × 13.1 |
| Char Length (in) | | 0.9 × 1.2 | 0.8 × 1.3 | 0.8 × 1.0 | 0.8 × 0.5 | 0.5 × 0.6 | 0.7 × 0.8 | 5.1 × 5.3 | 5.2 × 5.1 |
| 5X Wash | | | | | | | | | |
| After Flame (sec) | | 0.0 × 0.0 | 0.0 × 0.0 | 0.7 × 0.3 | 0.0 × 0.0 | 1.1 × 1.4 | 0.0 × 1.5 | 0.0 × 0.0 | 0.0 × 0.0 |
| After Glow (sec) | | 2.0 × 2.0 | 1.3 × 1.4 | 0.5 × 0.8 | 2.3 × 1.9 | 0.0 × 1.3 | 3.9 × 2.3 | 14.1 × 15.1 | 13.1 × 17.3 |
| Char Length (in) | | 0.7 × 0.9 | 1.8 × 3.6 | 0.5 × 0.5 | 0.6 × 0.9 | 0.3 × 0.4 | 0.6 × 0.6 | 5.3 × 5.0 | 4.9 × 5.1 |
| 25X Wash | | | | | | | | | |
| After Flame (sec) | | 0.0 × 0.0 | 0.0 × 0.0 | 1.2 × 0.4 | 0.0 × 0.0 | 0.6 × 1.3 | 0.0 × 0.0 | 0.0 × 0.0 | 0.0 × 0.0 |
| After Glow (sec) | | 2.4 × 3.1 | 0.8 × 1.4 | 0.8 × 1.4 | 5.6 × 6.0 | 1.7 × 0.0 | 2.3 × 1.8 | 9.5 × 12.5 | 9.0 × 12.9 |
| Char Length (in) | | 0.7 × 1.5 | 1.7 × 2.4 | 0.4 × 0.4 | 0.5 × 0.5 | 0.5 × 0.5 | 0.9 × 1.2 | 4.3 × 4.6 | 4.3 × 4.8 |
| Thermal Protective Performance - TPP (cal/cm$^2$) | | | | | | | | | |

TABLE-continued

| Criteria (units) | Test Source | INV Jersey | INV RIB | INV Stretch Rib | INV Interlock | INV Fleece | 1st COMP MATERIAL Rib Knit | 2nd COMP MATERIAL Modacrylic jersey | 3rd COMP MATERIAL Light Weight Modacrylic jersey |
|---|---|---|---|---|---|---|---|---|---|
| Single Layer with Spacer | NFPA 1971, 2000 ed. | 11.4 | 10.0 | 13.6 | 14.2 | 16.4 | 13.5 | 10.2 | |
| Single Layer without Spacer | | 10.2 | 8.0 | 11.5 | 11.1 | 14.5 | 11.2 | 7.3 | |
| 2 Layer No Spacer | | 19.6 | 15.7 | 21.7 | 24.0 | 16.4 | 22.9 | 14.2 | |
| Burst Strength (Ball)(lbs.) | | | | | | | | | |
| Initial | ASTM D3787 | 64 | 66.4 | 60.1 | 93.4 | 92.4 | 91.3 | 78.7 | 58.3 |
| after exposure (4 sec) | | 6.3 | 4.3 | 7.3 | 11.2 | 14.8 | 10.8 | 0.0 | 0.6 |
| Break Open | | | | | | | | | |
| Break-open (seconds) | MIL-C-83429B 3.7 | 37.8 | >60 | >60 | 48.5 | >60 | >60 | 2.7 | 1.9 |
| Manequin Burn 4 sec | ASTM F 1930 | no break-open | | no break-open | no break-open | | | break-open | |
| Manequin Burn 6 sec | | | | | no break-open | | | | |
| Thermal Stability | | | | | | | | | |
| % Shrinkage @ 500 F./5 Min | NFPA 1971, 2000 ed. | 12.2 × 6.8 | 1.0 × 0.5 | 3.9 × 2.9 | 12.5 × 7.7 | 14.9 × 13.1 | 13.3 × 0.7 | 3.0 × 0.6 | |
| % Cleaning Shrinkage | | | | | | | | | |
| (Home Launder, 5x) | AATCC 135, 1, III, Aii, | 2.5 × 1.3+ | 15.0+ × 12.0+ | 8.3 × 6.3+ | 6.1 × 3.7 | 5.6 × 4.7 | 18.8 × 38.8+ | 2.0 × 3.3 | |
| Pilling Resistance - Tumble | | | | | | | | | |
| 30 min | ASTM D 3512-2002 | 4-5 | 5 | 3 | 4 | 4-5 | 2 | 3 | |
| 60 min | | 4-5 | 4-5 | 3 | 4 | 4 | | 3 | |
| Moisture Vapor Transmission Rate | | | | | | | | | |
| MVTR (g/m2 * 24 hrs) | ASTM E-96, method B | 748.0 | | 751.1 | 764.4 | 679.8 | 715.1 | 741.0 | |
| Vertical Wicking | | | | | | | | | |
| (minutes) | Dupont Method | 95.5 mm/ 10 min | | 88.2 mm/ 10 min | 67.3 mm/ 10 min | 77.0 mm/ 10 min | 56.8 mm/ 10 min | 88.5 mm/ 10 min | |
| Drying Time | | | | | | | | | |
| (minutes) | Marines Internal Method 2/ | 45 minutes | | 66.7 minutes | | | | | |
| GATS TESTING | | | | | | | | | |
| Absorptive Capacity (grams) | NCSU | 2.5354 | | 3.7416 | | | | 3.048 | |
| Absorption Rate (g/min) | | 2.041 | | 2.3334 | | | | 2.472 | |
| Drying Time (min) | | 142 | | 194 | | | | 164 | |
| Drying Rate (g/min) | | 0.0179 | | 0.0193 | | | | 0.0186 | |
| Colorfastness (xenon) | AATCC 16E | | | | | | | | |
| GSc @ 20 Hr Exposure | AATCC EP 7:1998 | 4-5 | | 4-5 | | 3-4 | 4-5 | 4 | |
| GSc @ 40 Hr Exposure | AATCC EP 7:1998 | 4-5 | | 4-5 | | 3 | 4-5 | 3-4 | |
| Colorfastness to Crock | | | | | | | | | |

TABLE-continued

| Criteria (units) | Test Source | INV Jersey | INV RIB | INV Stretch Rib | INV Interlock | INV Fleece | 1st COMP MATERIAL Rib Knit | 2nd COMP MATERIAL Modacrylic jersey | 3rd COMP MATERIAL Light Weight Modacrylic jersey |
|---|---|---|---|---|---|---|---|---|---|
| Dry | AATC | 4-5 | | 5 | 5 | | | 4-5 | |
| Wet | C8 | 4-5 | | 4-5 | 3 | | | 3 | |
| Air Permeability | | | | | | | | | |
| (cfm) | ASTM D 737-1996 | 465 | | 455 | | 342 | 315 | 347 | |

The present invention may be embodied in other forms without departing from the spirit and the essential attributes thereof, and, accordingly, reference should be made to the appended claims, rather than to the foregoing specification, as indicated the scope of the invention.

We claim:

1. A textile fabric for a protective garment consisting of:
   5-20% by weight of a non-FR lyocell fiber,
   10-30% by weight of an inherently FR fiber, the inherently FR fiber is not a modacrylic fiber, and
   50-85% by weight of an FR cellulosic fiber, and
   the fabric reports no break open per ASTM F1930 at four seconds.

2. The textile fabric of claim 1 wherein the inherently FR fiber is made from a polymer selected from the group consisting of aramid, polyamide-imide, melamine, PBI, polyimide, PBO, PPS, PEEK.

3. The textile fabric of claim 2 wherein the inherently FR fiber is made from a polymer selected from the group consisting of PBI and PBO.

4. The textile fabric of claim 2 wherein the inherently FR fiber is made of PBI.

5. The textile fabric of claim 1 wherein the FR cellulosic fiber is an FR rayon.

6. The textile fabric of claim 1 wherein the fabric includes
   10% by weight of a non-FR lyocell fiber,
   20% by weight of an inherently FR fiber, and
   70% by weight of an FR cellulosic fiber.

7. A textile fabric for a protective garment comprising:
   5-20% by weight of a non-FR lyocell fiber,
   10-30% by weight of an inherently FR fiber, the inherently FR fiber is not a modacrylic fiber, and
   50-85% by weight of an FR cellulosic fiber, and
   the fabric reports no break open per ASTM F1930 at four seconds.

8. The textile fabric of claim 7 wherein the inherently FR fiber is made from a polymer selected from the group consisting of aramid, polyamide-imide, melamine, PBI, polyimide, PBO, PPS, PEEK.

9. The textile fabric of claim 8 wherein the inherently FR fiber is made from a polymer selected from the group consisting of PBI and PBO.

10. The textile fabric of claim 8 wherein the inherently FR fiber is made of PBI.

11. The textile fabric of claim 7 wherein the FR cellulosic fiber is an FR rayon.

12. The textile fabric of claim 7 wherein the fabric includes
    10% by weight of a non-FR lyocell fiber,
    20% by weight of an inherently FR fiber, and
    70% by weight of an FR cellulosic fiber.

13. The textile fabric of claim 12 wherein the inherently FR fiber is made of PBI.

14. A textile fabric for a protective garment comprising:
    5-20% by weight of a non-FR lyocell fiber,
    10-30% by weight of an inherently FR fiber, the inherently FR fiber is not a modacrylic fiber, and
    50-85% by weight of an FR rayon, and
    the fabric reports no break open per ASTM F1930 at four seconds.

* * * * *